United States Patent
Werblin et al.

(10) Patent No.: US 11,144,119 B2
(45) Date of Patent: *Oct. 12, 2021

(54) METHODS AND SYSTEMS FOR GENERATING A MAGNIFICATION REGION IN OUTPUT VIDEO IMAGES

(71) Applicant: Irisvision, Inc., Pleasanton, CA (US)

(72) Inventors: Frank S. Werblin, Berkeley, CA (US); Robert Massof, Pasadena, MD (US); Yuval S. Boger, Pikesville, MD (US)

(73) Assignee: Irisvision, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/447,481

(22) Filed: Jun. 20, 2019

(65) Prior Publication Data
US 2019/0302886 A1    Oct. 3, 2019

Related U.S. Application Data

(63) Continuation of application No. 16/137,003, filed on Sep. 20, 2018, now Pat. No. 10,444,833, which is a continuation of application No. 14/937,373, filed on Nov. 10, 2015, now Pat. No. 10,146,304.

(60) Provisional application No. 62/155,972, filed on May 1, 2015.

(51) Int. Cl.
*G06F 3/01* (2006.01)
*G02B 27/01* (2006.01)
*H04N 5/77* (2006.01)

(52) U.S. Cl.
CPC ............ *G06F 3/013* (2013.01); *G02B 27/017* (2013.01); *G02B 2027/014* (2013.01); *G02B 2027/0138* (2013.01); *G06F 2203/04805* (2013.01); *H04N 5/772* (2013.01)

(58) Field of Classification Search
CPC ........... G06F 3/013; G06F 2203/04805; G02B 27/017; G02B 2027/014; H04N 5/772
USPC ......................................................... 348/62
See application file for complete search history.

(56) References Cited

U.S. PATENT DOCUMENTS

| | | |
|---|---|---|
| 4,634,243 A | 1/1987 | Massof |
| 4,751,507 A | 6/1988 | Hama |
| 4,848,898 A | 7/1989 | Massof |
| 5,151,722 A | 9/1992 | Massof |

(Continued)

FOREIGN PATENT DOCUMENTS

| | | |
|---|---|---|
| EP | 2621169 A1 | 7/2013 |
| WO | 1992008157 A1 | 5/1992 |

(Continued)

OTHER PUBLICATIONS

Chen-Yung Hsu and Mark M. Uslan; When Is a Little Magnification Enough? A Review of Microsoft Magnifier, AccessWorld Magazine, Jul. 2000, vol. 1, No. 4.

(Continued)

*Primary Examiner* — Zaihan Jiang
(74) *Attorney, Agent, or Firm* — Novel IP

(57) ABSTRACT

A system and methods for the enhancement of a user's vision using a head-mounted and user-controllable device including a magnification bubble having variable attributes wherein a portion of the scene is magnified within the complete scene, wherein the user is able to modify, in real-time, how the images are processed including the attributes of the magnification bubble.

38 Claims, 8 Drawing Sheets

(56) References Cited

U.S. PATENT DOCUMENTS

| | | |
|---|---|---|
| 5,359,675 A | 10/1994 | Siwoff |
| 5,717,834 A | 2/1998 | Werblin |
| 5,719,593 A | 2/1998 | De Lange |
| 5,808,589 A | 9/1998 | Fergason |
| 5,933,082 A | 8/1999 | Abita |
| 6,061,064 A | 5/2000 | Reichlen |
| 6,067,112 A | 5/2000 | Wellner |
| 6,529,331 B2 | 3/2003 | Massof |
| 6,545,685 B1 | 4/2003 | Dorbie |
| 6,590,583 B2 | 7/2003 | Soohoo |
| 6,704,034 B1 | 3/2004 | Rodriguez |
| 7,486,302 B2 | 2/2009 | Shoemaker |
| 7,522,344 B1 | 4/2009 | Curatu |
| 7,542,210 B2 | 6/2009 | Chirieleison, Sr. |
| 7,612,804 B1 | 11/2009 | Marcu |
| 8,103,352 B2 | 1/2012 | Fried |
| 8,239,031 B2 | 8/2012 | Fried |
| 8,311,328 B2 | 11/2012 | Spruck |
| 8,350,898 B2 | 1/2013 | Chang |
| 8,490,194 B2 | 7/2013 | Moskovitch |
| 8,516,584 B2 | 8/2013 | Moskovitch |
| 8,571,670 B2 | 10/2013 | Fried |
| 9,213,185 B1 | 12/2015 | Starner |
| 9,545,422 B2 | 1/2017 | Greenberg |
| 9,891,435 B2 | 2/2018 | Boger |
| 10,146,304 B2 | 12/2018 | Werblin et al. |
| D848,420 S | 5/2019 | Boger |
| D863,300 S | 10/2019 | Boger |
| 10,444,833 B2 | 10/2019 | Werblin et al. |
| 10,488,659 B2 | 11/2019 | Boger |
| 2002/0101568 A1 | 8/2002 | Eberl |
| 2002/0181115 A1 | 12/2002 | Massof |
| 2003/0182394 A1 | 9/2003 | Ryngler |
| 2004/0136570 A1 | 7/2004 | Ullman |
| 2005/0162512 A1 | 7/2005 | Seakins |
| 2006/0129207 A1 | 6/2006 | Fried |
| 2006/0282129 A1 | 12/2006 | Fried |
| 2006/0290712 A1 | 12/2006 | Hong |
| 2007/0198941 A1 | 8/2007 | Baar |
| 2007/0235648 A1 | 10/2007 | Teich |
| 2007/0294768 A1 | 12/2007 | Moskovitch |
| 2008/0106489 A1 | 5/2008 | Brown |
| 2008/0184371 A1 | 7/2008 | Moskovitch |
| 2008/0238947 A1 | 10/2008 | Keahey |
| 2008/0247620 A1 | 10/2008 | Lewis |
| 2009/0059364 A1 | 3/2009 | Brown |
| 2009/0322859 A1* | 12/2009 | Shelton ............... G01B 11/2513 348/46 |
| 2010/0016730 A1* | 1/2010 | Tanaka ................... A61B 3/024 600/476 |
| 2010/0079356 A1 | 4/2010 | Hoellwarth |
| 2010/0283800 A1 | 11/2010 | Cragun |
| 2011/0102579 A1 | 5/2011 | Sung |
| 2011/0221656 A1* | 9/2011 | Haddick ............... G06Q 30/02 345/8 |
| 2011/0224145 A1 | 9/2011 | Greenberg |
| 2011/0241976 A1 | 10/2011 | Boger |
| 2012/0194550 A1 | 8/2012 | Osterhout |
| 2012/0212594 A1* | 8/2012 | Barnes ................... G06K 9/605 348/62 |
| 2012/0249797 A1* | 10/2012 | Haddick ................. G06F 3/016 348/158 |
| 2012/0262558 A1 | 10/2012 | Boger |
| 2012/0277826 A1 | 11/2012 | Fried |
| 2012/0316776 A1* | 12/2012 | Brown ............... G01C 21/3664 701/428 |
| 2013/0050273 A1* | 2/2013 | Fujimura ............... H04N 21/44 345/668 |
| 2013/0127980 A1 | 5/2013 | Haddick |
| 2013/0128364 A1 | 5/2013 | Wheeler |
| 2013/0242262 A1 | 9/2013 | Lewis |
| 2013/0329190 A1 | 12/2013 | Lewis |
| 2014/0098120 A1* | 4/2014 | Ritts ..................... G09G 5/026 345/589 |
| 2014/0192022 A1* | 7/2014 | Yamamoto ........... G06F 3/0488 345/174 |
| 2015/0103317 A1* | 4/2015 | Goldfain .................. A61B 3/10 351/207 |
| 2015/0169531 A1 | 6/2015 | Campbell |
| 2015/0234189 A1* | 8/2015 | Lyons ................ G02B 27/0093 345/174 |
| 2015/0348327 A1* | 12/2015 | Zalewski ................ H04M 1/05 345/419 |
| 2016/0063893 A1* | 3/2016 | Kanuganti ........... G09B 21/003 348/62 |
| 2016/0156850 A1 | 6/2016 | Werblin |
| 2016/0264051 A1 | 9/2016 | Werblin |
| 2017/0172675 A1* | 6/2017 | Jarc ..................... A61B 1/00193 |
| 2018/0239137 A1 | 8/2018 | Boger |
| 2019/0056783 A1 | 2/2019 | Werblin |
| 2019/0251679 A1 | 8/2019 | Werblin |
| 2020/0112691 A1 | 4/2020 | Werblin |

FOREIGN PATENT DOCUMENTS

| | | |
|---|---|---|
| WO | 1995006288 A2 | 3/1995 |
| WO | 1998044468 A1 | 10/1998 |
| WO | 2002086590 A1 | 10/2002 |
| WO | 2002099597 A2 | 12/2002 |
| WO | 2008055262 A2 | 5/2008 |
| WO | 2011159757 A2 | 12/2011 |
| WO | 2012142202 A1 | 10/2012 |
| WO | 2016077343 A1 | 5/2016 |
| WO | 2018053509 A1 | 3/2018 |
| WO | 2019094047 A1 | 5/2019 |
| WO | 2019160962 A1 | 8/2019 |

OTHER PUBLICATIONS

Richard D. Juday and David S. Loshin; Some Examples of Image Warping for Low Vision Prosthesis; Speidigitallibrary.org, Aug. 22, 1988.

Google Search of How to Install and Use Microsoft Magnifier, Mar. 29, 2018.

Gergely Vass and Tama Perlaki; Applying and removing lens distortion in post production, Colorfront Ltd., Budapest, 2003.

Eric Kenneth Victorson; A Head Mounted Digital Image Warping Prosthesis for Age-Related Macular Degeneration; U of Minn., May 2014.

International Search Report for PCT/US15/59950, dated Apr. 11, 2016.

Written Opinion of the International Searching Authority for PCT/US15/59950, dated Apr. 11, 2016.

* cited by examiner

METHODS AND SYSTEMS FOR GENERATING A MAGNIFICATION REGION IN OUTPUT VIDEO IMAGES

CROSS-REFERENCE TO RELATED APPLICATIONS

This application claims the benefit of U.S. Provisional Application No. 62/077,434, filed Nov. 10, 2014, U.S. Provisional Application No. 62/131,957 filed Mar. 12, 2015, and U.S. Provisional Application No. 62/155,972, filed May 1, 2015, U.S. patent application Ser. No. 14/937,373 filed Nov. 2, 2015 now U.S. Pat. No. 10,146,304 issued Dec. 4, 2018 and U.S. patent application Ser. No. 16/137,003 filed Sep. 22, 2018, the contents of which are hereby incorporated by reference in their entirety.

BACKGROUND OF THE INVENTION

Field of the Invention

The present invention generally relates to a vision-enhancement system and methods, and more particularly, to a head-mounted and user-controllable method and system for vision-enhancement and a system and method for configuring a vision-enhancement system.

Discussion of the Background

The normal human visual system establishes a non-magnified representation of a scene in the visual periphery with a high-resolution representation at the center of the visual field. Thus, the cornea and lens of the eye focuses a viewed scene onto the retina, which includes the fovea near the center of vision and a peripheral area. The fovea is a small area composed of closely packed cones near the center of the macula lutea of the retina. The fovea is responsible for sharp central vision, which is necessary for activities where visual detail is of primary importance, such as reading and driving.

The fovea is greatly expanded at the visual cortex and represents a significant magnification mechanism that allows a normally sighted person to discern the region of the visual world that is in "focus" on (faces, titles of dish soap, text), but sees that region in the broad context of an overall visual field.

A significant portion of the population suffers from low vision—those with visual acuity of 20/80 or worse. These people have difficulty reading, but also with mobile activities such as navigating and recognizing both people and objects at a distance. This disability greatly diminishes their quality of life, greatly limiting their ability to socialize, shop, cook and travel. Recent technical advances in digital technology have greatly improved the ability to read with large magnified CCTV displays, but mobility still remains a difficult challenge: magnification is effective for static activities like reading or watching TV, but does not enable a person to move through the environment while viewing a magnified view of the environment. The reason is that magnification of the entire image dramatically reduces the overall field of view. Thus, for instance, if a person with normal vision has a visual field of view of 180 degrees, a system that magnifies 6x reduces that field of view to 30 degrees, thus eliminating a person's peripheral vision.

Thus there is a need in the art for a method and apparatus that permits for enhanced representation of the visual world that also enables mobility for navigation and recognition. The methods and apparatus should be easy to use and be inexpensive.

BRIEF SUMMARY OF THE INVENTION

The present invention overcomes the limitations and disadvantages of prior art vision-enhancement systems and methods by providing the user with a head-mounted, user-adjustable system that provides a magnified view to the user along with peripheral vision.

It is one aspect to provide a device that can present to the user, in real-time, an enhanced video image of a scene surrounding the user so that the user can perform routine tasks. Certain embodiments include: 1) a head-mounted video camera that can obtain an input stream of video images of the scene in front of the user's head; 2) a processor to process the stream of input video images into a stream of output images that corrects for the user's vision deficiencies; and 3) a display for the processed video images that is viewable by the user.

It is another aspect to provide processed images of a scene that provides a smooth transition between an enhanced portion and an unmagnified peripheral portion. Thus, for example, in one embodiment, the processor performs a remapping of the video images to magnify a central portion of the video images (magnification bubble), to leave the peripheral portion either unmagnified or at a lower power of magnification than the bubble, and to provide a smooth transition between the magnification bubble and the peripheral portion so that the user can easily keep the magnified area within context of the viewed scene.

It is another aspect that the magnification of the scene varies smoothly across the image to prevent any discontinuities in the processed image and to assure that the remapping by itself does not introduce an additional scotoma or blind area. Thus, for example, the mapping may present an unmagnified image that contains no edges and include a magnified image at some central portion.

It is yet another aspect to provide a system that enhances images for people with low-vision by mapping each pixel of an imaged scene to an output image viewable by the user of the system. The mapping is performed, in one embodiment, to provide a smoothly varying magnification across the output image such that the user of the system can easily see how the magnified region is part of the peripheral area. Thus, for example, the user of the system can see every part of the original scene without any visual discontinuities.

It is one aspect to provide a device that can present to the user an enhanced video image of a scene surrounding the user and permit them to modify the enhancement in real-time. Thus the user can modify, for example, one or more attributes of the magnification bubble, including, without limitation, the magnifying power, the size of the magnification bubble, the shape of the magnification bubble, the position of the magnification bubble, and contrast and/or light level of the image.

It is one aspect to provide a portable vision-enhancement system wearable by a user. The system includes a memory including a stored program; a camera mounted on the user aimed to view the scene in front of the user's head and operable to obtain input video images of the scene; a processor programmed to execute the stored program to transform the input video images into a stream of output video images which include a magnification bubble wherein the processor is programmed to vary various attributes of the magnification bubble in response to an input that can be from the user; a screen disposed to be viewed by the user that displays the output video images; and a user-operable controller for generating an input to the processor by which various attributes of the magnification bubble can be modified.

Certain aspects provide a portable vision-enhancement system wearable on the head of a user. The system includes a memory including a stored program; a camera operable to obtain a stream of input images having a field of view corresponding to the orientation of the head of the user of the portable vision-enhancement system; a processor programmed execute the stored program to transform the accepted stream of obtained input images into a stream of output images; a screen that accepts and displays the stream of output images to the eyes of the user; and a device to accept input from the user. The stream of input images includes a first input image portion and a second input image portion and where the stream of output images includes a first output image portion including a first magnification of the first input image portion and a second output image portion including a second magnification of the second input image portion, where the second magnification is greater than the first magnification. The processor is adapted to modify the transform of the accepted stream of input images into the stream of output images according to according to the accepted input. The system is such that one or more of the eyes of the wearer of the portable vision-enhancement system is presented with an enhanced image of their field of view.

Certain other embodiments provide a clinician setup comprising: a monitor; and a controller, where the monitor and the controller are each configured to communicate with the portable vision-enhancement system, such that the monitor mirrors what is displayed on the screen and the controller provides access to the stored program, and such that a clinician can view the contents of the screen of the vision-enhancement system and, through the controller, modify parameters of the stored program such that the clinician controls how the processor modifies the transform of the accepted stream of input images into the stream of output images.

Certain embodiments provide a method for enhancing vision for a user using a system including a camera, a processor and a screen. The method includes: accepting a user input; accepting a stream of video images from the camera; image processing the accepted stream of video images in the processor programmed to include a magnification bubble, where the magnification bubble is varied according to accepted user input; and displaying the image processed stream of images on a screen viewable by the user.

These features, together with the various ancillary provisions and features which will become apparent to those skilled in the art from the following detailed description, are attained by the vision-enhancement system and method of the present invention, preferred embodiments thereof being shown with reference to the accompanying drawings, by way of example only, wherein:

Figure 1A:
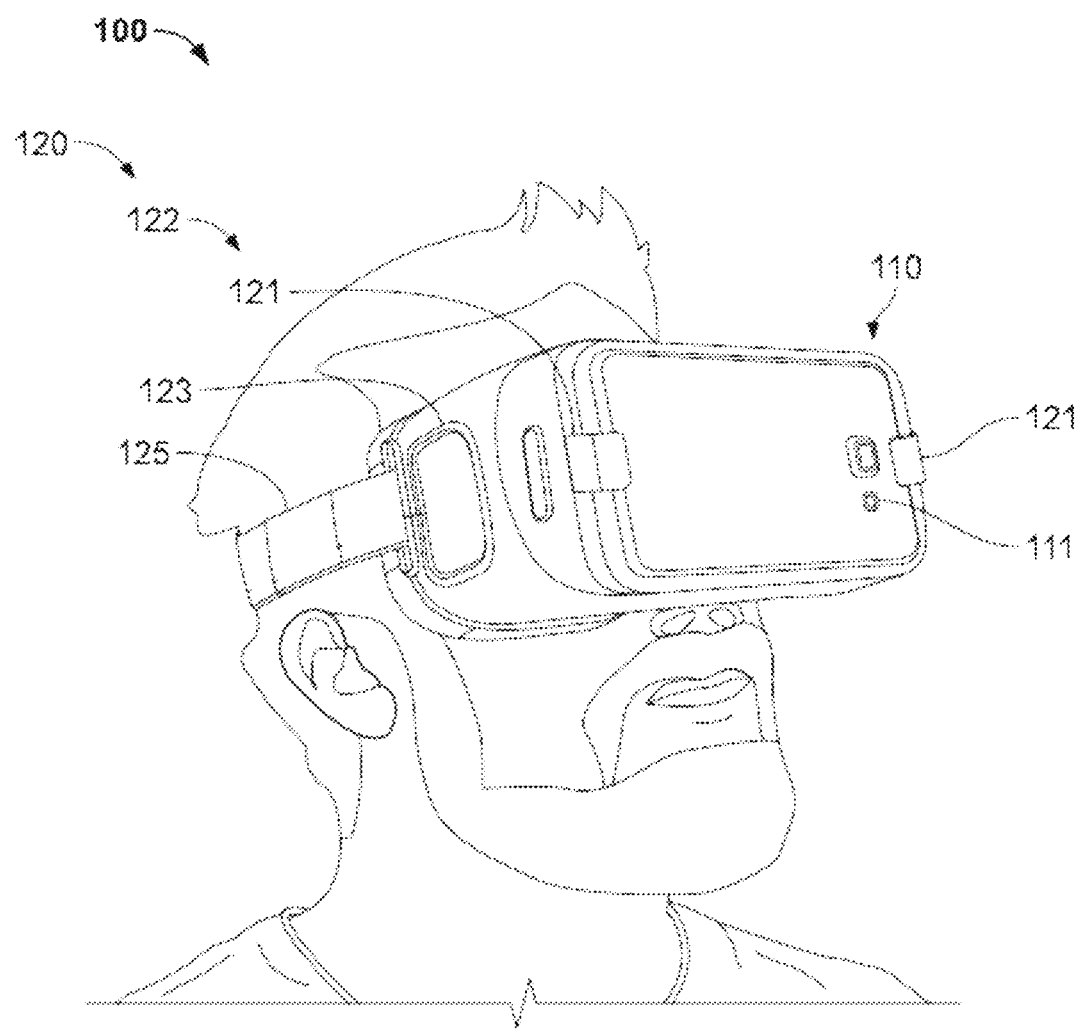
FIG. 1A shows a first embodiment user-controllable vision-enhancement system on a user.

Reference symbols are used in the figures to indicate certain components, aspects or features shown therein, with reference symbols common to more than one figure indicating like components, aspects or features shown therein.

DETAILED DESCRIPTION OF THE INVENTION

Certain embodiments of the inventive vision-enhancement system described herein includes: 1) a video camera to capture the scene that would be in the user's field of view if the user was not wearing the system; 2) a processor to image process the video of the captured scene; and 3) a screen to present the processed video images to the user's eyes. The modified video image compensates for the user's particular vision problem, such as low vision or AMD, by magnifying or otherwise moving central image to less impacted portions of the user's eyes while retaining the peripheral context of scene. Thus, the image of the majority of the scene is presented to the user according to an image transformation that maps the captured image, pixel-by-pixel, to an image that is more useful to the user.

The image-processed video modifies a scene in a way that allows the user to more easily recognize people or identify items in their surroundings. Thus, the user may be able to identify items on the supermarket shelf, recognize friends and neighbors, read street signs, and sit in an armchair to read a book.

Certain embodiments of the inventive vision-enhancement system are contained in a head-mounted apparatus. The head-mounted apparatus generally includes a digital video camera with a wide field of view, an image processing system capable of processing the camera images sufficiently rapidly to provide real-time processed images, and a high-resolution digital display, such as an organic light-emitting diode display (OLED) that presents a pair of images, one to each eye of the user. As described subsequently, the video camera is positioned to view the scene in a user's normal field of view and the image-processing image processes the images for a desired image enhancement. The users thus see what is presented on the display, which is an enhancement of the scene. In certain embodiments, the camera and display are provided by a smartphone that is mounted on goggles.

In certain embodiments, the stream of video camera images is image processed to form a stream of video output images having a magnified portion referred to herein as a "magnification bubble." The magnification bubble may be central to, or on the edge of, the output image. The output image within the magnification bubble is magnified relative to the portion outside of the magnification bubble. Thus, for example, the output image may be unmagnified, or uniformly magnified, except for a magnification bubble portion which includes a more highly magnified view of the video camera images. In addition, the magnification varies across the magnification bubble from a maximum value within the bubble to the magnification of the surrounding image outside of the bubble. The bubble thus has a progressively increasing magnification from the edge to the center. This can present the image with the magnification bubble without image discontinuities so that the magnified portion can be seen within context of the entire image.

Figure 1B:
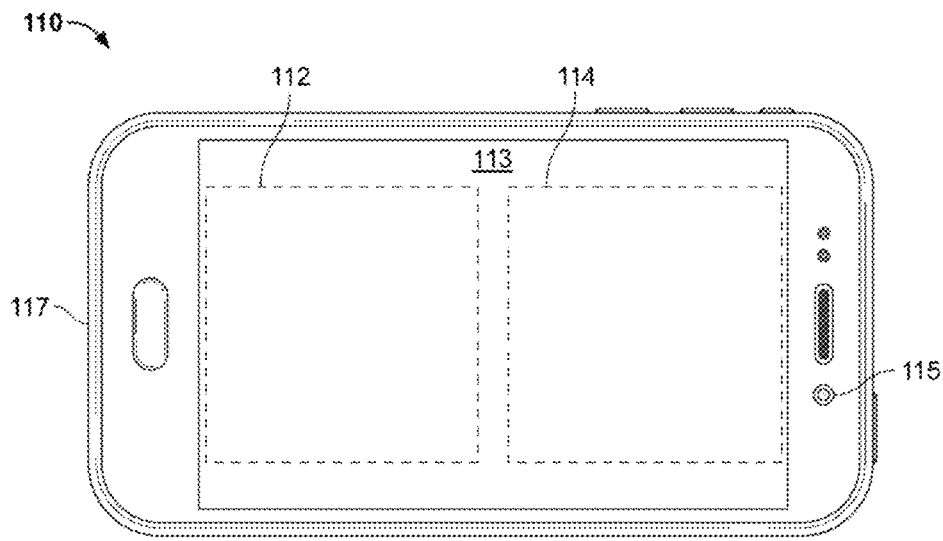
FIG. 1B shows a smartphone used in the system of FIG. 1A.
Figure 1C:
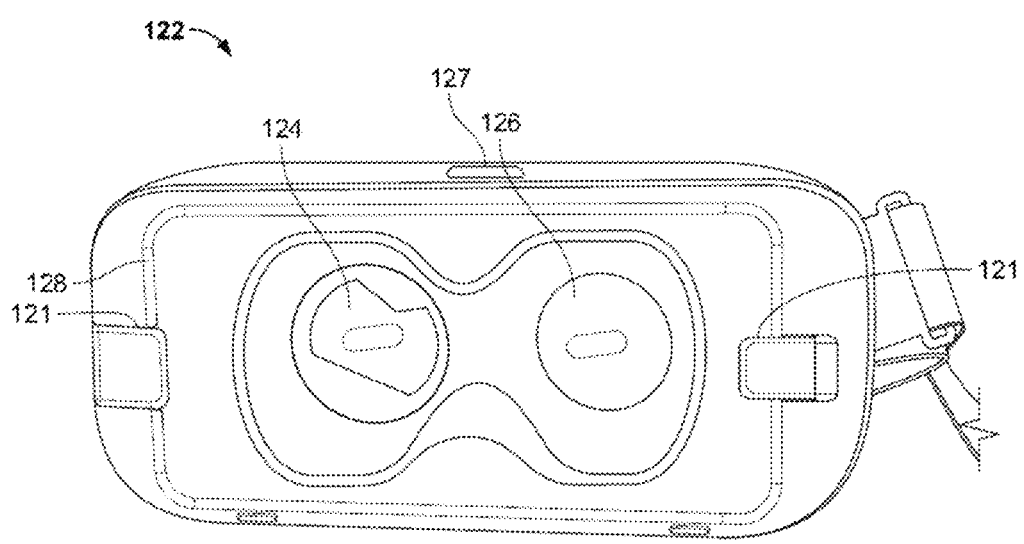
FIG. 1C shows the body of the goggle used in the system of FIG. 1A.

By way of a specific embodiment, FIGS. 1A, 1B, and 1C shows a first embodiment user-controllable vision-enhancement system 100, where FIG. 1A shows the system on a user, FIG. 1B shows a smartphone used in the system and FIG. 1C shows the body of the goggle used in the system. System 100 includes a smartphone 110 and pair of goggles 120. Smartphone 110 includes the electronics necessary for the vision-enhancement system 100, including a processor and memory (not shown), a forward facing camera 111, as shown in FIG. 1A, and a screen 113 on the side opposite the camera, as shown in FIG. 1B. Smartphone 110 also includes an electrical connector 117 and may also include a backward facing camera 115, which may be used in certain embodiments. As described subsequently, processed camera images are displayed on one portion of screen 113 shown as a left area 112 and a second portion of the screen is shown as right area 114.

Goggles 120 include a body 122 and a strap 125 for holding the goggles on the user's head and a connector 128 that mates with smartphone connector 117. Body 122 includes, as shown in FIG. 1A, a pair of clamps 121 for removably restraining smartphone 110 and making the electrical connection between connectors 117 and 128, and input device 123 for providing input to the smartphone through the connectors and, as shown in FIG. 1C, a left lens 124 and right lens 126 and a focusing wheel 127. When assembled as in FIG. 1A, with smartphone 110 held in place by clamps 121, system 100 presents what is displayed in area 112 of screen 113, through lens 124, to the user's left eye, and what is displayed in area 114 of the screen, through lens 126, to the user's right eye. The user may use focusing wheel 127 to adjust the focus. In certain embodiments, goggles 120 are adapted to accept user input from input device 123, which may control or otherwise provide inputs to the accepted smartphone 110.

In certain embodiments, smartphone 110 is provided with programming, as through a vision-enhancement application (referred to herein as a "VE App") which can: 1) operate camera 111 in a video mode to capture a stream of "input images"; 2) perform image processing on each input image to generate a stream of "output images"; and 3) present the stream of output images to screen 113. In certain embodiments, each of the stream out output images is presented sequentially side-by-side as two identical images—one in area 112 and one in area 114. Further, it is preferred that vision-enhancement system 100 operate so that the time delay between when the input images are obtained and when the output images are provided to screen 113 be as short as possible so that a user may safely walk and interact with the environment with goggles 120 covering their eyes.

In certain embodiments, the VE App may also provide a menu of options that allow for the modification of how vision-enhancement system 100 generates an output image from an input image. Thus, for example, vision-enhancement system 100 may execute image-processing algorithms having parameters, where the parameters are changeable through the menu by, for example, setting parameter values for magnification, or the size and shape of magnification of the output image.

Vision-enhancement system 100 has adjustable features that allow it to match the physiology of the user for use in different settings. These features are generally set once for each user, possibly with the need for periodic adjustment. Thus, for example, given the spacing between screen 113 and the eyes of user U, focusing wheel 127 permits for an optimal setting of the distance to lens 124 and 126. In addition, lens 124 and/or 126 may include refractive error correction. Further, it is important that the viewed spacing between the images in areas 112 and 114 match the user's interpupillary distance (IPD). This may be accounted for, by example, by shifting the spacing of the output images in areas 112 and 114 to match the IPD. Certain embodiments, described subsequently, include eye tracking to determine a user's gaze direction. For these systems, it is sometimes necessary to calibrate the system to obtain a correlation between the eye tracking measurement and actual gaze direction.

In various embodiments, the user may adjust setting using: input device 123, which may be a touchpad, and which is electrically connected to smartphone 110, which is further programmed to modify the VE App according to such inputs; a Bluetooth game controller that communicates with the smartphone 110 via Bluetooth; voice control using the microphone of the phone; gesture control using available devices such as the NOD gesture control ring (see, for example, http://techcrunch.com/2014/04/29/nod-bluetooth-gesture-control-ring/); or by the user of an eye tracker to implement gaze-directed control.

In addition, there are other features of vision-enhancement system 100 that can either be set up once for a user or may be user-adjustable. These features may include, but are not limited to, adjustments to the magnitude, shape, size, or placement of magnified portions of the output image, and color enhancement functions such as contrast, blur, ambient light level or edge enhancement of the entire image or portions of the image. In other embodiments, the compass and/or accelerometers within smartphone 110 may be used for enhancing orientation, location, or positioning of output images.

In certain embodiments, sound and/or vibration may be provided on smartphone 110 to generate for proximity and hazard cues. In other embodiments, the microphone of smartphone 110 can be used to enter voice commands to modify the VE App. In certain other embodiments, image stabilization features or programming of smartphone 110 are used to generate output images.

In one embodiment, by way of example only, goggles 120 are commercially available virtual-reality goggles, such as Samsung Gear VR (Samsung Electronics Co. Ltd., Ridgefield Park, N.J.) and smartphone 110 is a Galaxy Note 4 (Samsung Electronics Co. Ltd., Ridgefield Park, N.J.). The Samsung Gear VR includes a micro USB to provide an electrical connection to the Galaxy Note 4 and has, as input devices 123, a touch pad and buttons.

It will be understood by those in the field that vision-enhancement system 100 may, instead of including a combination of smartphone and goggles, be formed from a single device which includes one or more cameras, a processor, display device, and lenses that provide an image to each eye of the user. In an alternative embodiment, some of the components are head-mounted and the other components are in communication with the head-mounted components using wired or wireless communication. Thus for example, the screen and, optionally the camera, may be head-mounted, while the processor communicates with the screen and camera using wired or wireless communication.

Further, it will be understood that other combinations of elements may form the vision-enhancement system 100. Thus, an electronic device which is not a smartphone but which has a processor, memory, camera, and display may be mounted in goggles 120. Alternatively, some of the electronic features described as being included in smartphone 110 may be included in goggles 120, such as the display or communications capabilities. Further, the input control provided by input device 123 may be provided by a remote control unit that is in communication with smartphone 110.

Figure 1D:
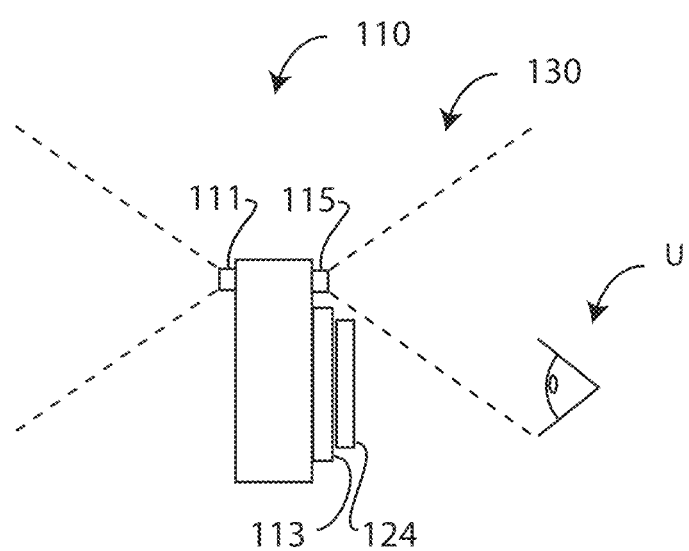
FIG. 1D shows a second embodiment user-controllable vision-enhancement system including devices for tracking eye movement.

In certain embodiments, vision-enhancement system 100 may include eye-tracking hardware and/or software, which allow the system to determine the direction of the user's gaze. Such systems typically process images of the eye to determine the gaze direction. This information may then be programmed into smartphone 110 to adjust screen 113 such that the transformed image features are automatically shifted relative to the gaze. Thus for example, FIG. 1D illustrates a vision-enhancement system 100 having eye tracking system 130 including a backwards facing camera 115 that obtains video images of the eye of user U. From these images, software can determine the direction the user is looking and can shift the output images to track the user's gaze. Alternatively, eye tracking may be determined separately from smartphone 110, which the tracking information provided to the smartphone. Thus, for example, eye-tracking hardware and/or software may be included in goggles 120 and communicated through which accepts input by tracking the user's gaze to a displayed menu.

Figure 1E:
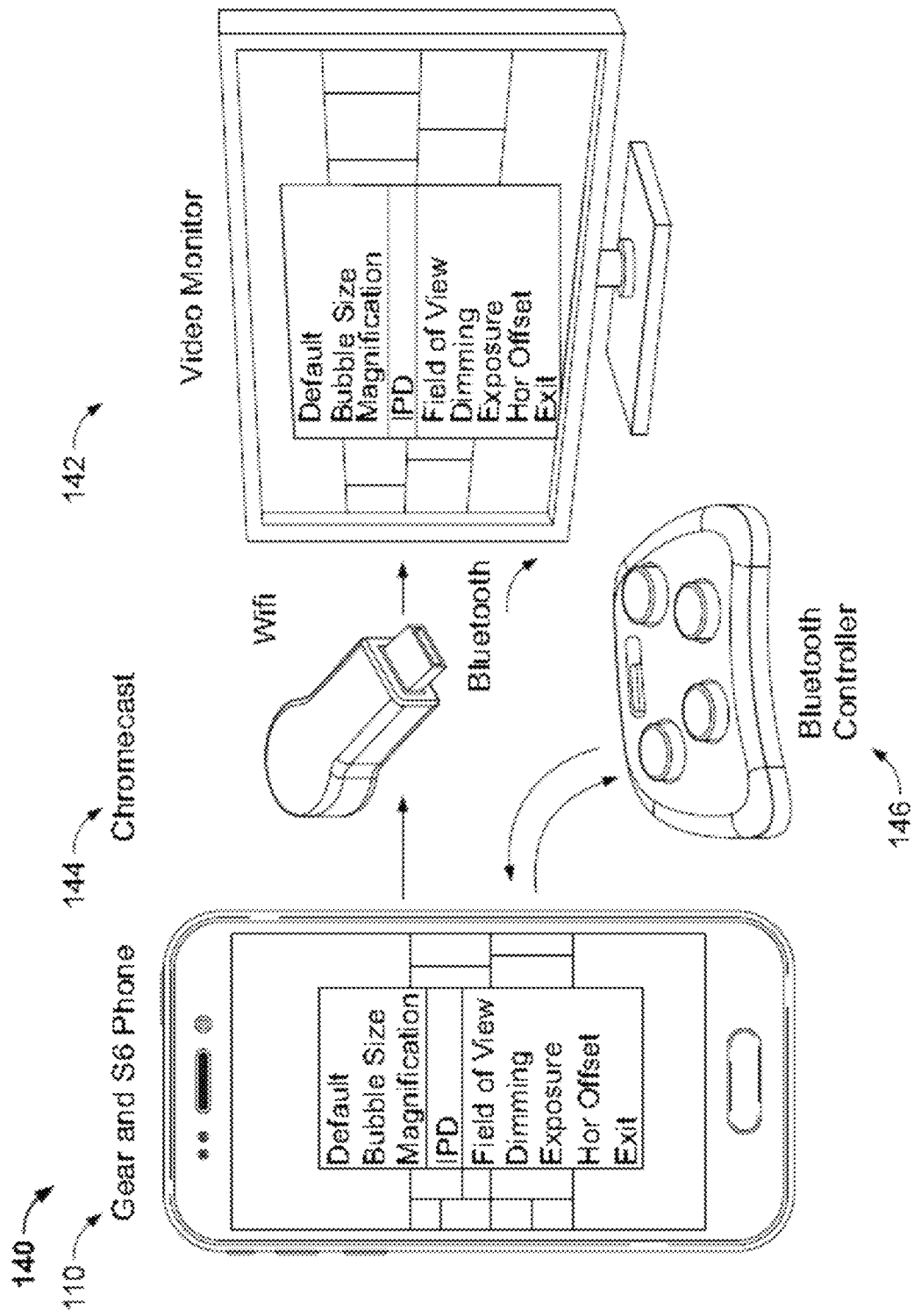
FIG. 1E shows a system which may be used to configure a vision-enhancement system.

FIG. 1E illustrates, without limitation, one embodiment of a clinical setup 140 that a clinician may user to configure vision-enhancement system 100. Clinical setup 140 may allow a clinician to determine and setup the VE App by setting an IPD, the field of view (fov), background dimming, ambient light level, as well as parameters that are also user-adjustable, such as the size, shape, magnification, and location of enhanced vision features, such as the magnification bubble described subsequently.

Clinical setup 140 thus allows for the adjustment or parameters within, or used by, the VE App that smartphone 110 runs to implement the vision-enhancement system 100. Clinical setup 140 includes a monitor 142, a Wi-Fi device 144 to allow screen 113 of smartphone 110 to be displayed on the monitor, and a Bluetooth controller 146 to communicate via Bluetooth with smartphone 110. In general, clinical setup 140 accepts a video output from smartphone 110 of display 113, and projects what the user would see when using vision-enhancement system 110 on monitor 142.

In certain embodiments, features or aspects of the inventive vision-enhancement system 100 may be adjusted by a clinician using clinical setup 140. Using the setting up vision-enhancement system 100, screen 113 of smartphone 110 is mirrored on a monitor, using Wi-Fi device 144, for example, so that the clinician can view what the user is viewing in vision-enhancement system 100. The VE App on smartphone 110 includes a menu that allows for the selection of certain parameters that operate vision-enhancement system 100.

The clinician has access to the commands in the menu of the VE App via remote Bluetooth controller 146. In this way, the clinician can "tune" the device to the specific visual demands of the user.

In certain embodiments, Wi-Fi device 144 can be used to remotely add, augment or modify functions allow vision-enhancements, mirror the display, monitor and control VE App configurations in a clinical environment. In certain embodiments, Bluetooth controller 146 can be used to control or modify visual enhancement functions. In certain other embodiments, the VE App may be reconfigured in a purely magnified format, making it possible for the low vision user to place phone calls, utilize maps, read announcements and perform all visual functions currently available to those with normal vision.

Examples of functional control of vision-enhancement system 100 provided by clinical setup 140 through the operation of the VE App may include, but are not limited to:

1. Mirroring the user's display via Wi-Fi.
2. Controlling magnification bubble size and magnification. The clinician will have the facility to control the low vision parameters such as magnification bubble size, magnification, contrast, edge enhancement ambient level and other visual enhancements to customize the device for the user.

Figure 2:
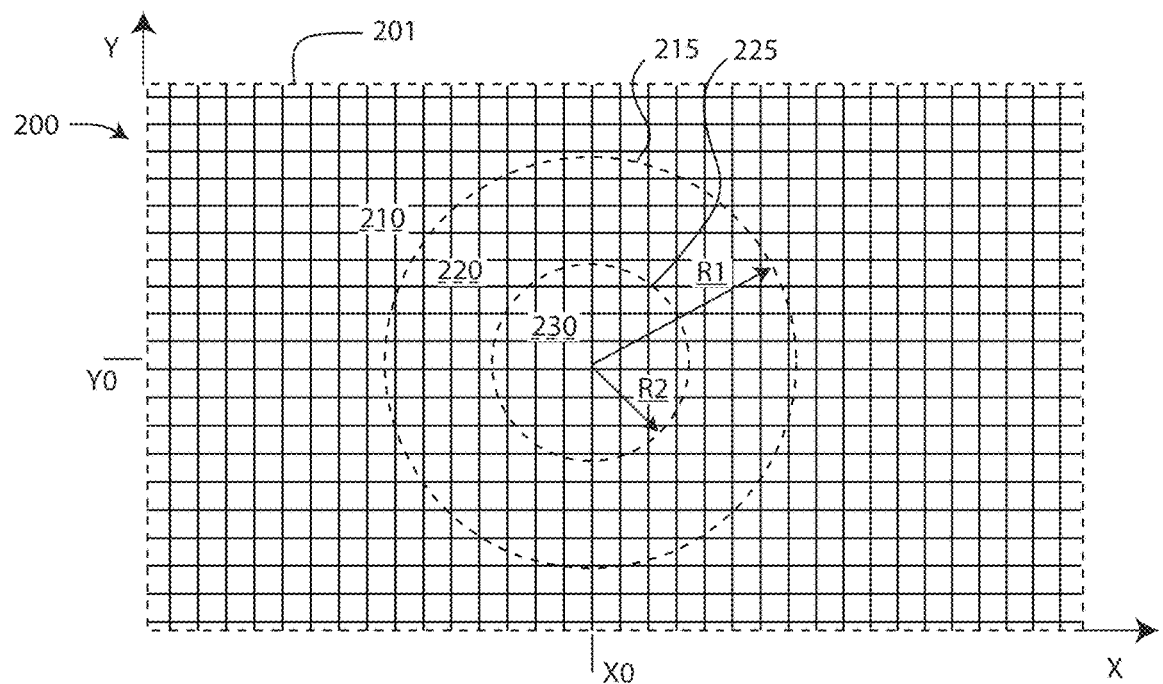
FIG. 2 shows an input image.
Figure 3:
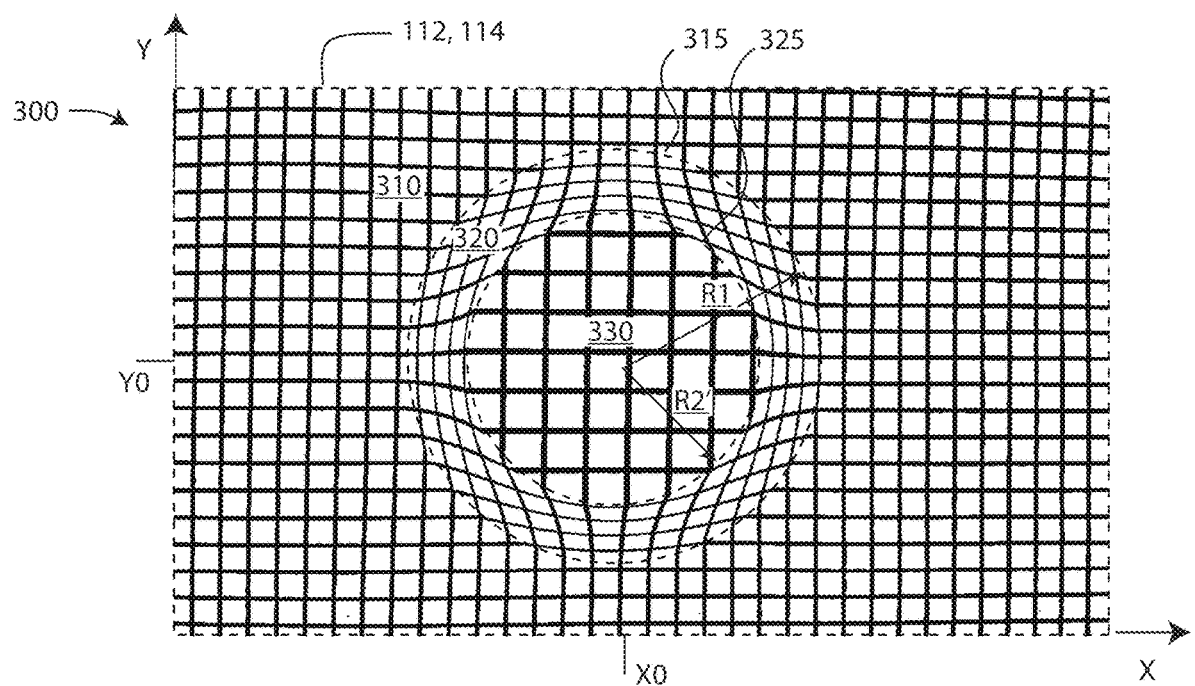
FIG. 3 shows a first embodiment output image.

One embodiment of the transformation of camera images into a displayed image is illustrated in FIG. 2, which shows an input image 200, and FIG. 3, which shows a first embodiment output image 300. As described subsequently, the image transformation accomplishes several objectives. First, a portion of the image is magnified. Second, a portion of the image surrounding the magnified portion is at a lower magnification, or is not magnified. Third, there is a transition between the two magnified portions. This image magnification presents the user with the magnified portion of the image within an easily recognizable context of the larger view.

Thus, for example, as shown in FIG. 2, input image 200 represents a camera image view of a scene, which is shown as a grid to aid in the following discussion. In general, input image 200 is any image or portion of an image captured by camera 111 and stored in the memory of smartphone 110. FIG. 2 is thus representative of a stored image, which may be stored in the memory of smartphone 110 in any one of a number of video formats.

For the purposes of one explanation of the illustrated embodiment, image 200 is shown as having an outer portion 210 between an outer edge 201 and a first boundary 215, a middle portion 220 between first boundary and a second boundary 225, and an inner portion 230 within the second boundary. Boundaries 215/225 are concentric circles, where first boundary 215 has a radius R1 and second boundary 225 has a radius of R2.

One embodiment performs a transformation or mapping of input image 200 into output image 300, as shown in FIG. 3 and which may be, for example, one or both of display areas 112/114. Output mage 300 is shown as having an outer portion 310 between an outer edge 301 and a first boundary 315, a middle portion 320 between first boundary and a second boundary 325, and an inner portion 330 within the second boundary. Boundaries 315/325 are concentric circles, where first boundary 315 has a radius R1 and second boundary 325 has a radius of R2'.

The transformation of image 200 to output image 300 maps the image within outer portion 210 to outer portion 310, the image within middle portion 220 to middle portion 320, and the image within outer portion 230 to outer portion 330. The transformation generally maps each image pixel in image 200 a pixel within image 300, within the limitations of the image or display resolution. The transformation also includes multiple levels of magnification, such as high magnification of inner portion 230 a lower, or unity, magnification of outer portion 210, and a smoothly varying magnification in middle portion 220, which ranges from the magnification of outer portion 210 at first boundary 215 to the magnification of outer portion 230 at second boundary 215.

Thus, for example: outer portion 210 is mapped to outer portion 310 with unity magnification; inner portion 230, with a radius of R2, is mapped to inner portion 330 with a radius of R2' at a uniform magnification of $(R2'/R2)^2$; and middle portion 220 is mapped to middle portion 330 from a magnification that varies smoothly from a unity magnification at first boundary 315 to magnification of $(R2'/R2)^2$ at second boundary 325.

The regions of increased magnification, such as regions 320 and 330, are the magnification bubble. It will be appreciated that the bubble may be round, as in the above embodiments, or may have a generally rectangular shape, which may be useful for reading, or may be placed anywhere within region 300, including near edge 301. In certain embodiments, the magnification bubble is stationary on the display, and the user may position the bubble by moving their head. The gradual change in magnification combined with the wide field of view allow a user to easily position the magnification by their head movement to where it is most needed. Thus, the user may move their head to magnify words as necessary and thus easily read the text.

The magnification bubble is thus located within the overall visual scene with a smooth transition to the unmagnified portion. This allows for magnification of the scene in a way that allows a user to view the magnified image within the context of the overall scene.

The mapping of the image from input image to output image may, in addition, have certain user-controllable features. Thus, for example and without limitation, the magnification is greatest at the center of the bubble and varies gradually and continuously to unity magnification near the bubble's edge, and remains constant to the edge of the image. In certain embodiments, the bubble may be defined mathematically or algorithmically by several variables which may include, but are not limited to: 1) the diameter of the bubble; 2) the peak magnification of the bubble; and 3) the sharpness of the edge of the bubble (that is, how rapidly the magnification changes near the edge). The user may be provided with controls (described subsequently) that permit them to change one or more parameters of the bubble, such as the peak magnification, the bubble diameter, or the rate of transition of magnification from center to edge of the bubble.

Figure 4:
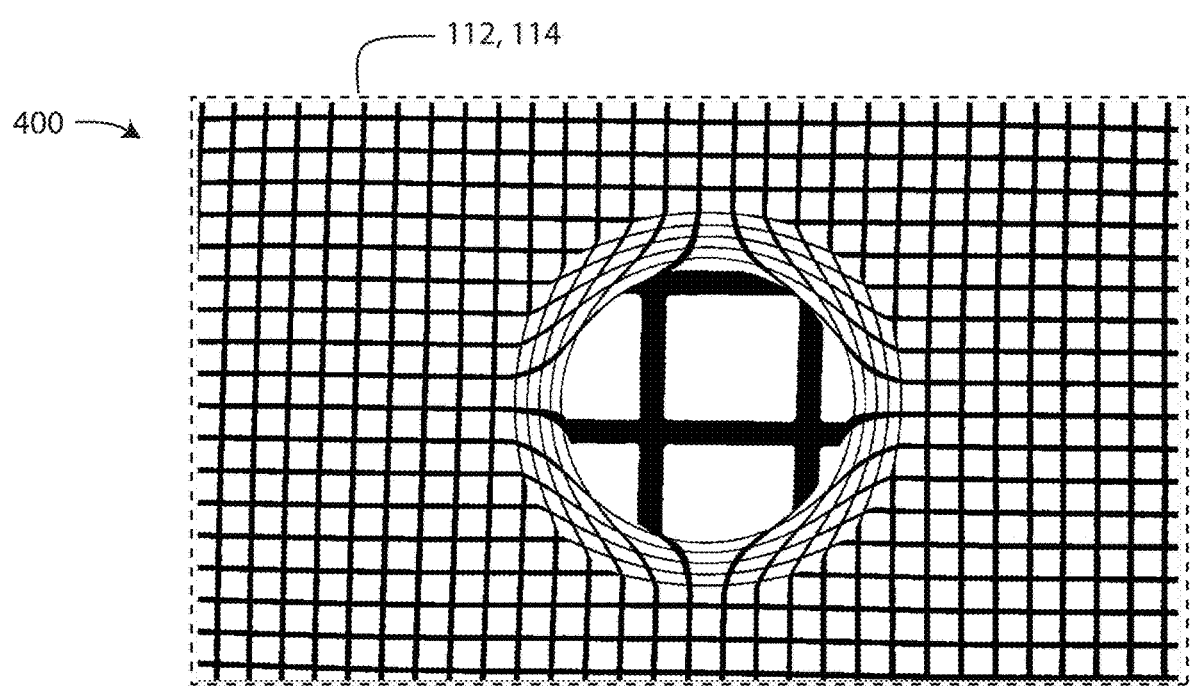
FIG. 4 shows a second embodiment output image.

Thus, for example, a user may, through input device 123, modify the transformation to move the magnification bubble within display areas 112/114, or change the magnification and/or transition to peak magnification. FIG. 4, for example, shows a second embodiment output image 400, where, relative to output image 300: 1) the region magnified and the magnification bubble are shifted to the right, resulting a different area to be magnified; 2) the radius of second boundary 225 is decreased, resulting in a larger magnification with the same magnification bubble size; and 3) the radius of first boundary 215 is decreased, resulting in a decreased magnification bubble size and a decreased size of the transition from the unmagnified to magnified image portions.

In certain embodiments, the bubble may be defined mathematically or algorithmically by several variables which may include, but are not limited to: 1) the diameter of the magnification bubble; 2) the peak magnification of the magnification bubble; and 3) the sharpness of the edge of the magnification bubble (that is, how rapidly the magnification changes near the edge). The user may be provided with controls (described subsequently) that permit them to change one or more parameters of the magnification bubble, such as the peak magnification, the magnification bubble diameter, or the rate of transition of magnification from center to edge of the magnification bubble.

Figure 5:
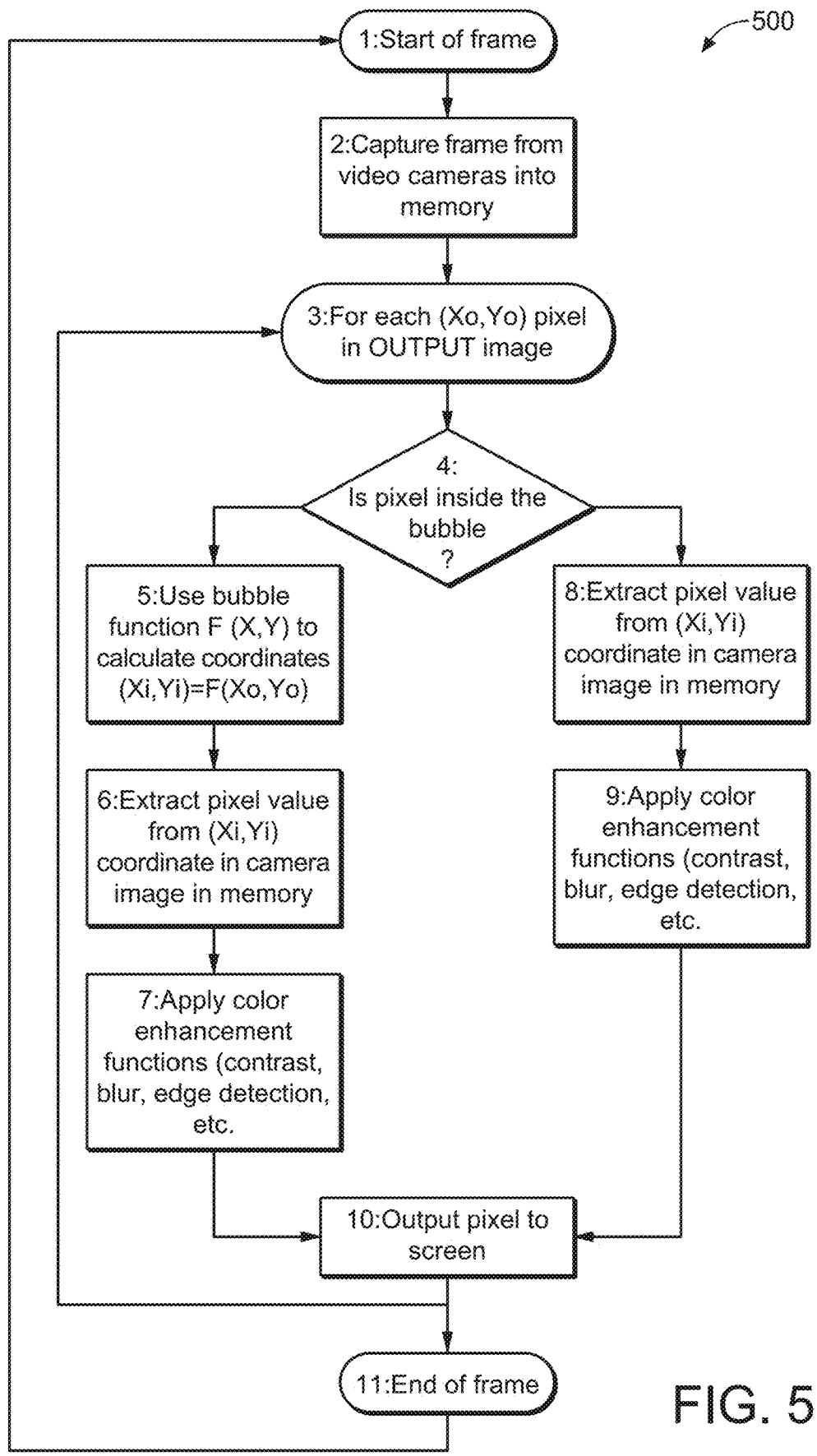
FIG. 5 is a flowchart on one embodiment of the transformation performed by smartphone.
Figure 6:
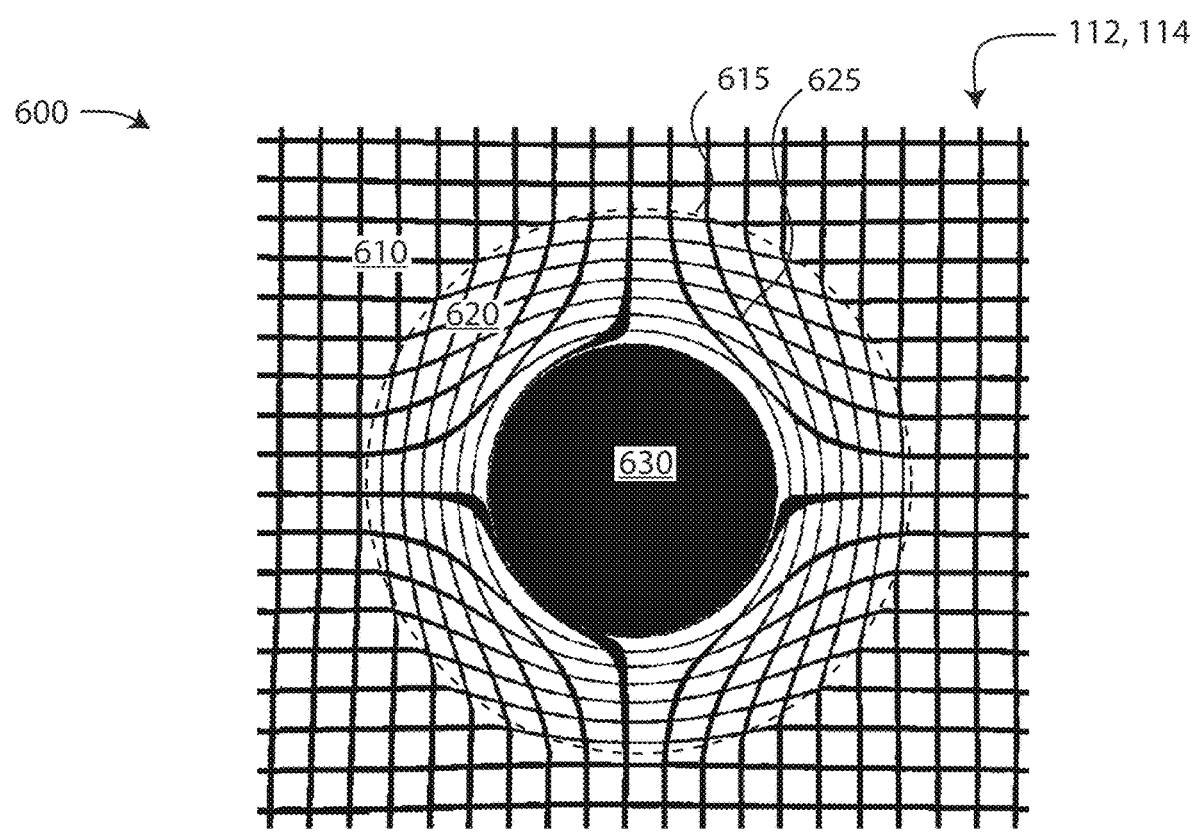
FIG. 6 is an illustration depicting the gradual reduction in magnification between the fully magnified region and the unmagnified region of the scene.

In one embodiment, a VE App is provided to smartphone 110 which performs image processing on each image of the stream of video images and then presents each processed area, simultaneously, to areas 112 and 114. FIG. 5 is a flowchart on one embodiment of the transformation performed by smartphone 110.

In Block 1, starts the method, which runs continuously until stopped by the user.

In Block 2, images are captured of the scene. Images from stream of images are read from camera into memory. Depending on the architecture of the particular device and the capabilities and performance of the camera and the processing CPU, this may be done in one of two ways:

a. Read the entire image into memory and then process all pixels in the image, or b. Read a collection of pixels (essentially a slice of the image) and process it while another slide is being read.

In Block 3, Blocks 4-10 are repeated for each pixel in the destination (e.g. output) image In Block 4, determine if the pixel being analyzed in the output image is inside the magnification bubble. The magnification bubble can be of various shapes. For instance, it may be a circle centered on a particular point on the screen. It may be an ellipse centered on a particular point. It may a variety of shapes where the specific shape and size are personalized to the needs of the user. If the pixel is inside the magnification bubble, perform the steps of Blocks 5-7. If the pixel is not inside the bubble, perform steps of Blocks 8-9.

In Block 5, based on the specific mapping function, determine the coordinates in the input image from which the particular pixel in the output image comes from. These coordinates are referred to as the input coordinates.

In Block 6, determine the color values of the pixel from the input image. If the input coordinates do not exactly match coordinates of the input image, estimate that color by using well-known image processing algorithms such as "nearest neighbor," "bilinear interpolation," or "bicubic interpolation." If the input coordinates fall outside the input image, place a fixed value such as black, or some other user-defined value.

In Block 7, once the color values have been determined, optionally apply additional color enhancement functions such as contrast, blur or edge enhancement.

In Block 8, determine the color values of the pixel from the input image. This step is relevant to pixels outside the magnification bubble. The transformation from output coordinates to input coordinates is simpler here and might be as simple as zoom or even no transformation at all. If the input coordinates do not exactly match coordinates of the input image, estimate that color using well-known image processing algorithms such as "nearest neighbor," "bilinear interpolation," or "bicubic interpolation." If the input coordinates fall outside the input image, place a fixed value such as black or some other user-defined value.

In Block 9, once the color values have been determined, optionally apply additional color enhancement functions such as contrast, blur, or edge enhancement. This step is relevant to pixels outside the magnification bubble.

In Block 10, output the resultant color to output image.

In Block 11, repeat this entire process until stopped.

The following is a pseudo code that implements an alternative algorithm for transforming an input image into an output image. Thus, for example, the following pseudo code may be implemented in software that is stored in a VE App in the memory of smartphone 110. The VE App may be programmed to accept input, as through input device 123, for changing one or more parameters of the VE App. Also, in alternative embodiments, the VE App may be operated to provide a menu of whereby the user, or a clinician, may modify one or more parameters in the memory of the VE App. Thus, for example, VE App may be programmed to accept input, as through input device 123, and set a parameter value, either in the VE App or in a file stored in the memory of smartphone 110, which the VE App accesses in producing an output image.

The algorithm determines for each pixel of the output image, the corresponding input image location and color value, and then assigns the corresponding input image color value to the output image. The following algorithm calculates the transform for a circular magnification bubble at the center of the image with a uniform magnification, Mag, across the inner portion.

For the following discussion, each pixel of the input image (such as input image 200) at coordinates (x, y), has a color value I(x, y), and each pixel of the output image (such as output image 300) at coordinates (x',y'), has a color value O(x',y'). One embodiment of an algorithm performs the steps of: 1) for each pixel location of the output image (with coordinates (x',y')), determine the mapped (corresponding) pixel location of the input image (with coordinates (x', y')=(x(x',y'), y(x',y')); 2) determine the color value of the input image at the mapped location, that is, I(x(x',y'), y(x', y')); and 3) set the color value of the corresponding output image pixel to that of the mapped pixel on the input image, that is, O(x',y')=I(x(x',y'), y(x',y')). The mapping (x(x',y'), y(x',y')) accounts for the magnification of the image. The image coordinates are further transformed so that the center of the magnification bubble in the input and output images is at (x,y)=(x',y')=(0, 0), which may be either at a predetermined image location or maybe input, as by using touchpad 123.

As a more detailed example of this embodiment, a transition parameter k is selected, either using touchpad 123 or by having a preselected value, and a radius R2' is determined as input, for example, using touchpad 123. The value of R1 is calculated from k as R1=R2'*√k.

For each output image pixel, the distance d from the pixel to the center of the is calculated as d=√((x')²+(y')²).

Next, the value of d is compared to the values of R1 and R2'. If d>R1, then image area corresponds to the outer portion (portions 210 and 310), and the value of the output image pixel is the same as the value of the input image at the same pixel locations. That is, the output pixel value at (x', y'), which is O(x',y'), is the same as the input image pixel value at the same coordinates (x, y), is the same as the input pixel value (x', y'), and O(x', y')=I(x, y).

If d<R2', then the image area corresponds the inner portion (portions 230 and 330), and the image is uniformly magnified by an amount MAG, which may be either preselected or input, for example, using touchpad 123. The radius R2' is mapped to the input image as R2=R2'/MAG, the coordinates (x', y') map to (x/MAG, y/MAG), and thus the output color value is O(x', y')=I(x/MAG, y/MAG). For MAG>1, the image within the input image radius R2 is thus mapped to being within the larger output image radius R2'=R2*MAG.

Lastly, if R2'≤d≤R1, then the image area corresponds to the middle portion (portions 220 and 320), and the transformation smoothly transforms from unity magnification in outer portion 310 to magnified inner portion 330. The pixel location (x', y') is mapped to:

$$(x, y) = \left[\left(\frac{R2'}{d}\right)^2 \times \left(\frac{1}{MAG} + \frac{d^2 - R2'^2}{R2'^2(k-1)}\left(k - \frac{1}{MAG}\right)\right)\right](x', y'),$$

and the output color value is mapped to O(x', y')=I(x, y). Thus, for example, when d=R1=R2'*√k, the value of $$\left(\frac{R2'}{d}\right)^2 \times \left(\frac{1}{MAG} + \frac{d^2 - R2'^2}{R2'^2(k-1)}\left(k - \frac{1}{MAG}\right)\right) = 1,$$

the pixel location (x', y') is mapped to (x, y), and O(x', y')=I(x, y)—the correct value near outer portion 310.

As another example, when d=R2', and the pixel location (x', y') is mapped to (x/MAG, y/MAG), and O(x', y')=I(x, y)=I(x/MAG, y/MAG)—the correct value near inner portion 330.

In certain embodiments, the user is thus provided with an image that varies as they move their head. Thus, for example, it may be most useful for a user to have the magnification bubble coincide with the central part of the user's vision. In certain embodiments, some calibration of the system is required, so that the eye tracking system can adequately determine the location of the gaze.

In one embodiment, the forward looking camera obtains input images of a scene, which is magnified or otherwise transformed from the input images and displayed on system 100. If the user wishes to view a modified portion of the scene, they move their head to center the area of interest in the modified view. In certain other embodiments, eye tracking, as in the embodiment of FIG. 1D, automatically shifts the displayed image with the gaze of the user. Thus, for example, eye tracking computes the location of the user's gaze, and shifts the center of the magnification bubble to correspond to the center of the user's gaze.

One embodiment of each of the devices and methods described herein is in the form of a computer program that executes as an app on a smartphone. It will be appreciated by those skilled in the art, embodiments of the present invention may be embodied in a special purpose apparatus, such as a pair of goggles which contain the camera, processor, and screen, or some combination of elements that are in communication and which, together, operate as the embodiments described.

It will be understood that the steps of methods discussed are performed in one embodiment by an appropriate processor (or processors) of a processing (i.e., computer) system, electronic device, or smartphone, executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

What is claimed is:

1. A portable vision-enhancement system comprising:
a memory including a stored program;
a camera mounted to view a scene in front of a user and operable to obtain input video images of the scene;
a processor programmed to execute the stored program to transform the input video images of the scene into a stream of output video images of the scene wherein the processor is configured to generate a magnification region that enlarges the output images of the scene, vary a size of the magnification region in response to an input signal, and define the size of the magnification region such that the magnification region includes the entire output video image of the scene and wherein the processor is configured to generate the magnification region having a magnification level that has a higher magnification level near a center of the magnification region and a lower magnification level near an edge of the magnification region; and
a screen disposed to be viewed by the user and configured to display the output video images.

2. The portable vision-enhancement system of claim 1, wherein the processor is further programmed to determine if a pixel in at least one of the output video images is within the magnification region.

3. The portable vision-enhancement system of claim 2, wherein, if the processor determines the pixel is within the magnification region, the processor further determines coordinates of the pixel in at least one of the input video images.

4. The portable vision-enhancement system of claim 3, wherein the processor is further configured to determine a color value of the pixel based on said coordinates.

5. The portable vision-enhancement system of claim 4, wherein the processor is further configured to apply a color enhancement function to the pixel.

6. The portable vision-enhancement system of claim 5, wherein the color enhancement function is at least one of contrast, blur or edge enhancement.

7. The portable vision-enhancement system of claim 2, wherein, if the processor determines the pixel is not within the magnification region, the processor further uses at least one of the input video images to determine a color value of the pixel.

8. The portable vision-enhancement system of claim 1, wherein the portable vision-enhancement system comprises:
a smartphone including the display, the processor, the memory, and the camera; and
a pair of goggles, wherein the smartphone is adapted to be operatively mounted on the goggles such that the camera views the scene in front of the user.

9. The portable vision-enhancement system of claim 8, wherein the goggles are adapted to receive the input signal from the user and convey the input signal to the smartphone.

10. The portable vision-enhancement system of claim 1, wherein the processor is configured to generate the magnification region having at least one of a circle shape, an elliptical shape, or a rectangular shape.

11. The portable vision-enhancement system of claim 1, wherein the processor is further configured to execute the stored program in order to mirror the display to a second display.

12. The portable vision-enhancement system of claim 1, wherein the processor is further configured to execute the stored program in order to receive data indicative of a direction the user is looking.

13. The portable vision-enhancement system of claim 1, wherein the processor is further configured to form a transition region between an inside of the magnification region and an edge of the magnification region, wherein the transition region has a magnification level that is between a magnification level defining the inside of the magnification region and a magnification level defining the edge of the magnification region.

14. The portable vision-enhancement system of claim 1, wherein the processor is further configured to execute the stored program in order to receive data indicative of at least one of a peak magnification of the magnification region, a sharpness of an edge of the magnification region, and a size of the magnification region.

15. The portable vision-enhancement system of claim 14, wherein the processor is further configured to modify the magnification region in accordance with said received data.

16. The portable vision-enhancement system of claim 1, wherein the processor is further configured to transform the input video images to the output video images by mapping a color value for a first pixel at a first set of coordinates in at least one of the input video images to a second pixel at second set of coordinates in at least one of the output video images, wherein the first set of coordinates is different from the second set of coordinates.

17. The portable vision-enhancement system of claim 1, wherein the processor is further configured to position the magnification region such that is coincides with a central part of the user's vision.

18. The portable vision-enhancement system of claim 17, wherein the processor is further configured to move the magnification region as the user moves.

19. The portable vision-enhancement system of claim 1, further comprising wherein the processor is further configured to move the magnification region as the user moves.

20. A portable vision-enhancement system comprising:
a memory including a stored program;

a camera mounted to view a scene in front of a user and operable to obtain input video images of the scene;

a processor programmed to execute the stored program to transform the input video images of the scene into a stream of output video images of the scene wherein the processor is configured to generate a magnification region that enlarges the output images of the scene, vary a size of the magnification region in response to an input signal, and define the size of the magnification region such that the magnification region includes the entire output video image of the scene and wherein the processor is configured to form a transition region between an inside of the magnification region and an edge of the magnification region, wherein the transition region has a magnification level that is between a magnification level defining the inside of the magnification region and a magnification level defining the edge of the magnification region; and a screen disposed to be viewed by the user and configured to display the output video images.

21. The portable vision-enhancement system of claim 20, wherein the processor is further programmed to determine if a pixel in at least one of the output video images is within the magnification region.

22. The portable vision-enhancement system of claim 21, wherein, if the processor determines the pixel is within the magnification region, the processor further determines coordinates of the pixel in at least one of the input video images.

23. The portable vision-enhancement system of claim 22, wherein the processor is further configured to determine a color value of the pixel based on said coordinates.

24. The portable vision-enhancement system of claim 23, wherein the processor is further configured to apply a color enhancement function to the pixel.

25. The portable vision-enhancement system of claim 24, wherein the color enhancement function is at least one of contrast, blur or edge enhancement.

26. The portable vision-enhancement system of claim 21, wherein, if the processor determines the pixel is not within the magnification region, the processor further uses at least one of the input video images to determine a color value of the pixel.

27. The portable vision-enhancement system of claim 20, wherein the portable vision-enhancement system comprises:

a smartphone including the display, the processor, the memory, and the camera; and a pair of goggles, wherein the smartphone is adapted to be operatively mounted on the goggles such that the camera views the scene in front of the user.

28. The portable vision-enhancement system of claim 27, wherein the goggles are adapted to receive the input signal from the user and convey the input signal to the smartphone.

29. The portable vision-enhancement system of claim 20, wherein the processor is configured to generate the magnification region having at least one of a circle shape, an elliptical shape, or a rectangular shape.

30. The portable vision-enhancement system of claim 20, wherein the processor is configured to generate the magnification region having a magnification level that from a higher magnification level near a center of the magnification region to a lower magnification level near an edge of the magnification region.

31. The portable vision-enhancement system of claim 20, wherein the processor is further configured to execute the stored program in order to mirror the display to a second display.

32. The portable vision-enhancement system of claim 20, wherein the processor is further configured to execute the stored program in order to receive data indicative of a direction the user is looking.

33. The portable vision-enhancement system of claim 20, wherein the processor is further configured to execute the stored program in order to receive data indicative of at least one of a peak magnification of the magnification region, a sharpness of an edge of the magnification region, and a size of the magnification region.

34. The portable vision-enhancement system of claim 33, wherein the processor is further configured to modify the magnification region in accordance with said received data.

35. The portable vision-enhancement system of claim 20, wherein the processor is further configured to transform the input video images to the output video images by mapping a color value for a first pixel at a first set of coordinates in at least one of the input video images to a second pixel at second set of coordinates in at least one of the output video images, wherein the first set of coordinates is different from the second set of coordinates.

36. The portable vision-enhancement system of claim 20, wherein the processor is further configured to position the magnification region such that is coincides with a central part of the user's vision.

37. The portable vision-enhancement system of claim 36, wherein the processor is further configured to move the magnification region as the user moves.

38. The portable vision-enhancement system of claim 20, further comprising wherein the processor is further configured to move the magnification region as the user moves.

* * * * *